Figure 1:
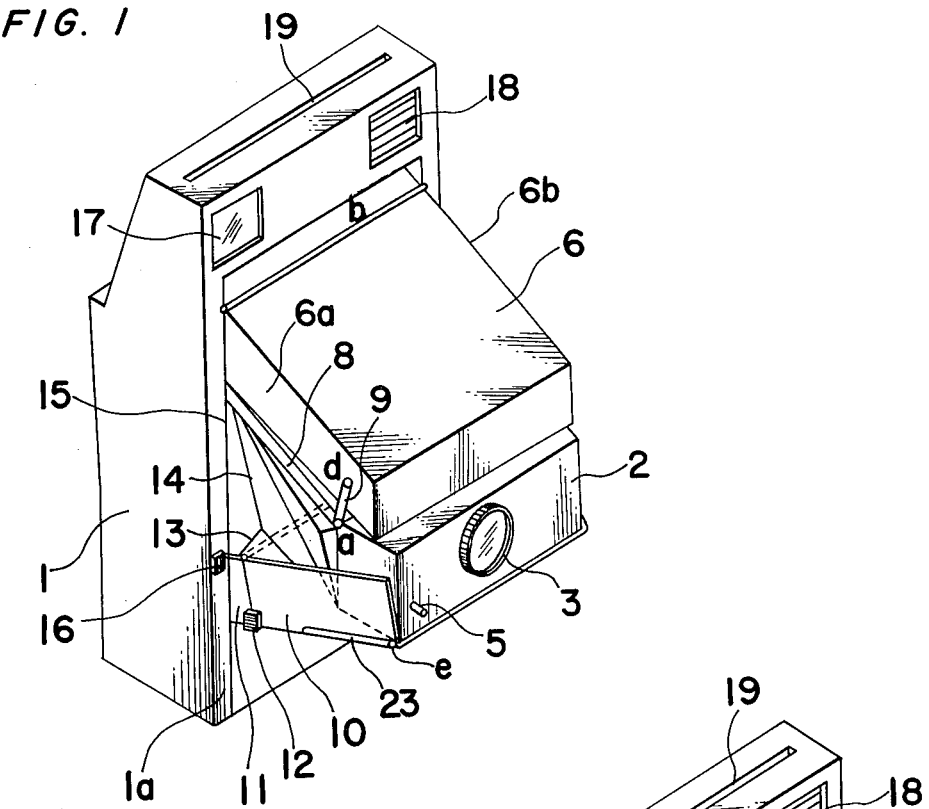

United States Patent [19]

Munakata et al.

[11] 4,075,645
[45] Feb. 21, 1978

[54] FOLDING CAMERA

[75] Inventors: Tsuneaki Munakata, Tokyo; Makoto Kuboshima, Sagamihara, both of Japan

[73] Assignee: Fuji Photo Film Co., Ltd., Minami-ashigara, Japan

[21] Appl. No.: 754,806

[22] Filed: Dec. 27, 1976

[30] Foreign Application Priority Data

Dec. 27, 1975  Japan .................................. 51-157227

[51] Int. Cl.² ............................................. G03B 17/04
[52] U.S. Cl. ..................................................... 354/187
[58] Field of Search ......................... 354/187, 192–194

[56] References Cited

U.S. PATENT DOCUMENTS

| 3,668,991 | 6/1972 | Erlichman ...................... 354/192 X |
| 3,832,726 | 8/1974 | Finelli ................................ 354/187 |
| 3,877,046 | 4/1975 | Sorimachi et al. .............. 354/187 X |
| 4,006,488 | 2/1977 | Kuboshima ....................... 354/187 |

FOREIGN PATENT DOCUMENTS 2,328,226  12/1974  Germany .............................. 354/192

Primary Examiner—John Gonzales
Attorney, Agent, or Firm—Sughrue, Rothwell, Mion, Zinn and Macpeak

[57] ABSTRACT

Folding camera wherein a lens mount carrying at least a taking lens assembly may be held in a position for taking photographs by a case and a folding box assembly, the case being connected to the lens mount through linkage assemblies and also serving to contain electrical circuit elements for control of the camera flash system. The folding box assembly consists of two boxes which are fixedly held in alignment with one another and provide a rigid support for the lens mount when the camera is open, and are folded into the camera to define a single box which encloses the lens mount when the camera is folded, at which time the outer walls of the case and folding box assembly constitute front and lower wall portions of the camera.

4 Claims, 7 Drawing Figures

FOLDING CAMERA

The present invention relates to a folding camera. More particularly the invention relates to a folding camera which has a simplified and more compact folding structure and is especially suited to use as an auto-process camera.

There has recently been proposed various types of so-called auto-process cameras. In such a camera, film material employed is in the form of independent film units rather than in the form of a continuous roll of film, a plurality of film units generally being initially contained in a pack which is loaded in an exposure compartment defined inside the camera, and the camera and/or film unit pack comprising means for pressing the foremost film unit in the pack against a front frame of the pack and in line with exposure openings which are defined in the film unit pack and exposure compartment and constitute an exposure station whereat the foremost film unit may be exposed to image-wise light reflected from a scene to be photographed, and each successive film unit, immediately to being exposed, is moved independently to the exterior of the camera, during which movement developing and processing solution is spread through the film unit by the action of processing and forwarding rolls through which the film unit is passed, whereby there is produced a positive image in the film unit by the so-called diffusion-transfer process and there is obtained a positive print in a very short time. During forwarding of an exposed film unit to the exterior of the camera, a suceeding film unit in the film unit pack is brought to the exposure station, in readiness for production of a subsequent photograph. Generally, an auto-process camera must be larger than a camera employing roll film, since it must be at least enough to contain sheets of photosensitive material equal in size to finished prints. Because of the increased size of auto-process cameras transport thereof can be inconvenient, and there have accordingly been proposed various types of auto-process camera with a folding-camera construction.

One folding-camera construction proposed is a bellows-type construction in which a lens assembly is provided at the forward end of a bellows and may be moved along an outwardly extendable, pivotally mounted table to an outwardly extended position for taking photographs, at which time the table is extended generally at right-angles to the front wall of the camera, or to a retracted position, at which time the table is generally flat with respect to the camera front wall and the lens assembly is on the inner side of the table, the bellows being expanded or folded radially with respect to the optical axis of the lens assembly as the lens assembly is moved to the outwardly extended position or to the retracted position. However, use of such a bellows-type construction, which is known to give a bulkier camera construction even in conventional roll-film cameras, results in a very unwieldy camera construction when employed in association with larger auto-process cameras.

Alternatively it has been known to provide an auto-process camera with folding lens-mount support means which may move a lens mount carrying a lens assembly to an outwardly extended position for taking photographs or to a retracted position for facilitating transport of the camera. However, construction of conventional folding support means cannot yet be said to have been simplified to a saisfactory degree, in addition to which in conventional folding auto-process cameras of this type it is generally necessary to make available extra camera space for accommodation of lens-mount support means, with the result that the camera is larger, or when the lens-mount support means is folded at least a portion thereof must be external to the main body portion of the camera, with the result that optimum compactness and flatness of the camera permitting convenient transport thereof fail to be achieved.

It is accordingly a principal object of the invention to provide a folding camera having a simplified and more compact construction.

It is another object of the invention to provide a folding camera which has a flat case profile when folded to facilitate transport thereof, and which is particularly advantageous when employed as an auto-process camera.

It is a further object of the invention to provide a folding camera in which setting of a lens mount to an extended position for taking of photographs or folding of the lens mount and lens-mount support means to a retracted position may be simply effected by a photographer.

It is yet another object of the invention to provide a folding camera comprising lens-mount support elements which are dual-purpose elements, whereby space requirements in the camera are reduced.

In accomplishing these and other objects, there is provided according to the present invention, a folding camera wherein a lens mount carrying a taking lens assembly, lens-aperture setting means, and other known means for effecting controlled exposure of film material, has fixedly attached to diametrically opposed upper and lower corner portions thereof shafts which extend along the entire width of the lens mount. Each opposite end of one shaft is in sliding and rotatory connection to one end of a forward box, which together with a rear box constitutes a folding box assembly. Each end of the other shaft constitutes a link pin in a quadrilateral linkage consisting of three link rods and one side of a case containing flash control elements, batteries, and similar means. The case is movable to an open position in which it is inclined forwardly with respect to the front wall of the camera or to a closed position in which it lies in an opening defined in the front portion of the camera and the outer cover of the case is flat with respect to the camera front wall. When the case is moved to the open position, the folding box assembly also, due to the connection with the lens mount, is moved to an opened position, in which it may be locked, and in which it is inclined forwardly with respect to the camera front wall and is also inclined towards the case, the forward box and rear box being in end-to-end alignment with one another when the folding-box assembly is in the opened position. When the case and folding-box assembly are in these positions, the lens mount is moved to and held in a position which is determined by the relative dimensions of the case and folding-box assembly and in which the lens assembly carried thereby is positioned to permit accurate focussing of image-wise light on film material located at an exposure station in the camera.

When the case is moved to the closed position, the connection of the lens mount causes the folding-box assembly to be folded to a position in which the forward box and rear box together constitute a single, open-ended box, and the lens mount to be simultaneously moved out of line with the exposure station and into the space defined by this open-ended box. When the case and folding-box assembly have been completely moved to the closed and folded positions, the outer cover of the case constitutes in effect a portion of the camera front wall, the folding-box assembly constitutes lower wall portions of the camera, the camera thus having a flat and compact outline, and the lens mount is completely enclosed in the folding-box assembly, whereby lens assembly elements and other components are protected during transport of the camera.

Between the lens mount and the exposure station there is provided a foldable opaque cover, which, when the lens mount is in the outwardly extended position, has the general section of a truncated pyramid and permits unhindered passage of light from the lens assembly in the lens mount to film material at the exposure station, and which, when the lens mount is moved to the retracted position, is moved sideways and simultaneously folded flat onto a plane generally level with that of the exposure station.

Figure 2:
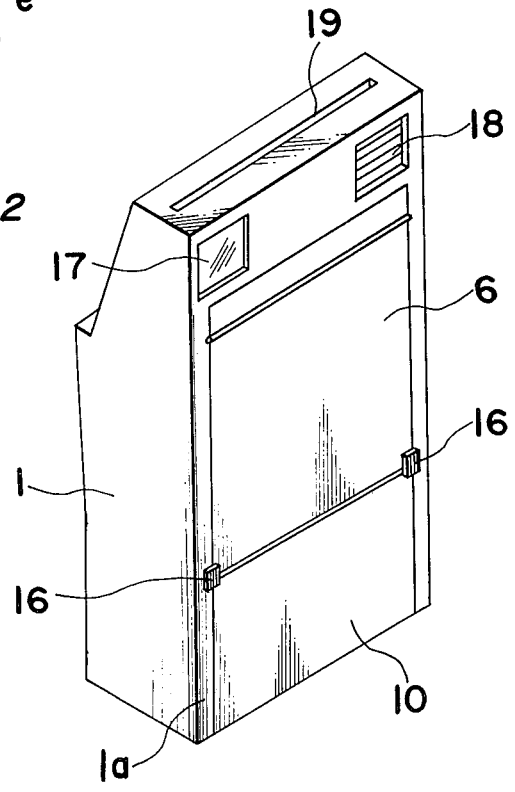
Figure 4:
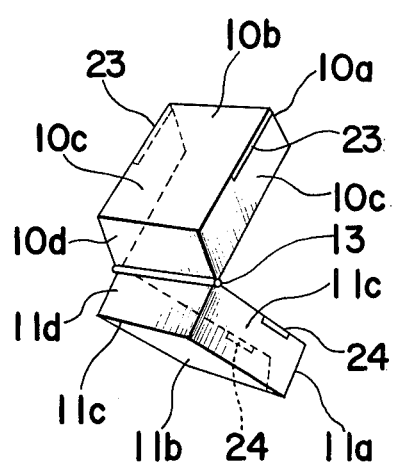
Figure 5:
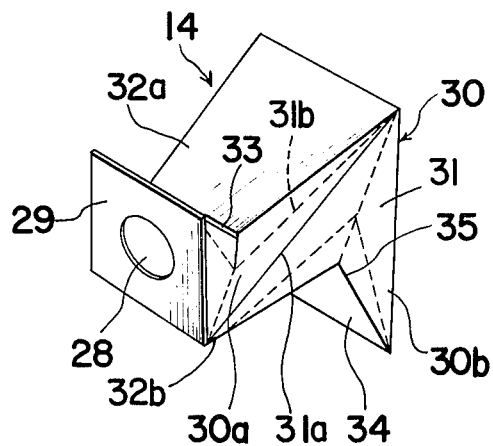

A better understanding of the present invention may be had from the following full description thereof when read in reference to the attached drawings in which like numbers refer to like parts, and FIG. 1 is a perspective view of a folding camera according to the invention in an opened condition permitting photographs to be taken;

FIG. 2 is a perspective view of the camera of the invention in a folded condition;

FIG. 3(a), 3(b), and 3(c) are schematic cross-sectional views illustrating successive stages of opening or folding of the folding camera according to the invention;

FIG. 4 is a perspective view showing details of a folding-box assembly employed in the camera of the invention; and FIG. 5 is a perspective view of a foldable opaque hood element employed in the camera of the invention.

Before proceeding with the present description it is to be noted that reference to upper or lower portions or front or rear portions of elements of the camera of the invention indicates upper or lower portions thereof or portions thereof which are forwardly or rearwardly located with respect to the main body portion of the camera when the camera is in an opened condition for taking photographs.

Referring to FIGS. 1 and 2, there is shown a folding camera for production of photographs by the diffusion-transfer process which comprises a main body portion 1 in the upper portion of which there is provided a viewfinder 17 and flash cube 18, and in the top wall of which there is defined an exit slit 19 via which successive exposed and processed film units may be moved to the exterior of the camera. Normally, i.e., when the elements of the camera are disposed to permit photographs to be taken, this being the disposition shown in FIG. 1, a lens mount 2, in which is supported a taking lens assembly 3 and which also carries for example a shutter, shutter-speed and lens-aperture setting means, and a shutter actuation button 5, or similar known film exposure control means, is held between the outer ends of a case 6 and a folding-box assembly (10, 11) comprising a forward box 10 and a rear box 11 in a first lens mount position, in which position the lens mount 2 is in a forwardly extended position, clear of the front wall 1a of the camera and is in an attitude permitting photographs to be taken, the folding-box assembly (10, 11) providing support to the lower side of the lens mount 2 and the case 6 to the upper side thereof.

Extending between and attached at opposite ends to the lens mount 2 and an exposure compartment 15 constituted in a rear portion of the camera there is an opaque hood element 14, which, when the lens mount 2 is in the first lens mount position is extended and defines a central hollow space permitting passage of image-wise light from the lens assembly 3 to the exposure compartment 15, and which, as described in greater detail below, has a construction permitting it to be folded flat when the lens mount 2 is brought to a second lens mount position in which the lens mount 2 is retracted and brought to the camera interior.

As shown in FIG. 2, when the camera is folded, the case 6 is accommodated in an opening defined in the front portion of the camera, and the folding-box assembly (10, 11) effectively constitutes outer wall portions of the lower portion of the camera, the lens mount 2 being in the second lens mount position and contained in the folding-box assembly (10, 11), and the bottom wall of the forward box 10 and the upper wall of the case 6 being generally level with the camera front wall 1a.

Referring to FIG. 3(a), a film unit pack 25 loaded in the exposure compartment 15 defines a front opening which together with a corresponding opening defined in the exposure compartment 15 constitutes an exposure station whereat a foremost film unit 27 in the pack 25 may be exposed to image-wise light, the lens assembly 3 being brought into front-to-rear line with the exposure station, i.e., into an attitude in which the optical axis thereof is generally normal to the plane of the exposure station, when the lens mount 2 is held at the first lens mount position. Subsequent to exposure thereof, successive film units 27 are moved out of the film unit pack 25 and are processed and simultaneously moved via the exit slit 19 to the exterior of the camera by processing rolls 26 provided in the camera interior above the film unit pack 25.

Referring to FIG. 1 and FIG. 3(a), the case 6 has the general contour of a flat, rectangular box, contains therein a flash circuit, batteries and similar lighting control elements connecting to the flash cube 18, and normally extends forwardly and downwardly from an upper portion of the front of the camera main body portion 1. A rear end portion of the outer wall of the case 6 is pivotally mounted on a fixed shaft b which extends between opposite side wall portions of the opening defined in the front of the camera main body portion 1, the rearmost end portion of the case 6 being inside the camera main body portion 1. The left-to-right dimension of the case 6 is generally equal to that of the folding box assembly (10, 11) and slightly less than that of the opening in the front portion of the camera, which permits the case 6 and folding-box assembly (10, 11) to be fitted therein, in a manner described in greater detail below.

Each end of the shaft b is connected by a short link rod 7 to a fixed link pin a, which is located rearwardly and downwardly of the shaft b. Each link rod 7 is freely pivotal both about the shaft b and about the corresponding link pin a. Each link pin a is further connected by a long link rod 8, which extends in a line very approximately parallel to the long axis of the side of the case 6, to a link pin d constituted by one end of a shaft which is fixedly mounted on the upper rear corner portion of the lens mount 2 and extends the entire width of and to slightly beyond the side edges of the lens mount 2. Each link rod 8 is freely pivotal about the corresponding link pins *a* and *d*. Each link pin *d* is further connected by a short link rod 9 to a link pin *c* which is fixedly attached to a forward end portion of a side wall, 6*a* or 6*b*, of the case 6, the link pins *c* and *d* permitting free pivotal movement of each link rod 9. Thus, on each side of the case 6 there is in effect constituted a linkage consisting of link rods 7, 8, and 9 and one side, 6*a* or 6*b*, of the case 6.

Referring to FIG. 4, the folding-box assembly (10, 11) consists of a rectangular forward box 10 and a rectangular rear box 11, which are approximately equal in size, and each of which is open-topped and defines a single open end. The forward box comprises a bottom wall 10*b*, opposite side walls 10*c*, and an end wall 10*d*, and defines an open end 10*a* opposite the end wall 10*d*. The rear box 11, which has a similar construction, comprises a bottom wall 11*b*, opposite side walls 11*c*, and an end wall 11*d*, and defines an open end 11*a*. The distance between the side walls 10*c* of the forward box 10, or between the side walls 11*c* of the rear box 11, is slightly greater than the width of the lens mount 2. The combined height of the side walls 10*c* and 11*c* is considerably greater than the height of the lens mount 2, and is approximately equal to the front-to-rear dimension of the lower portion of the camera.

Figure 3:
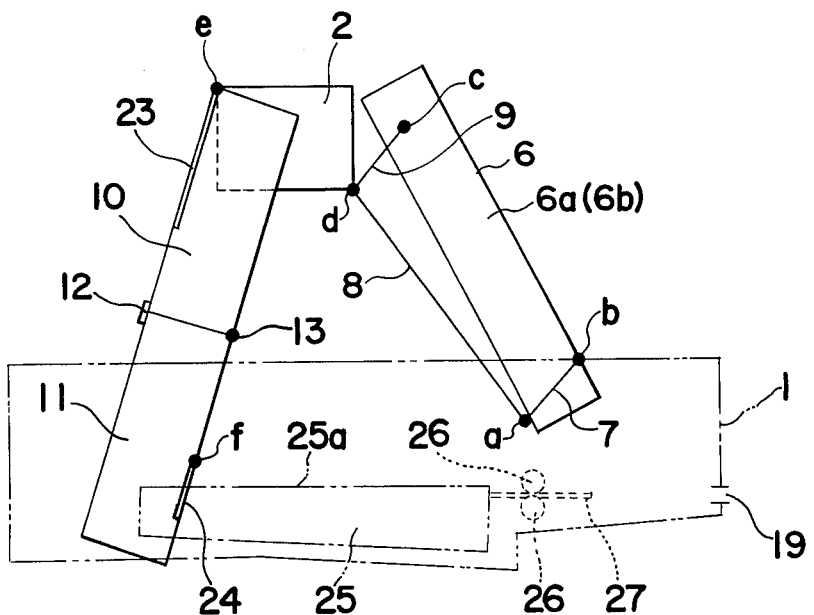
Figure 3:
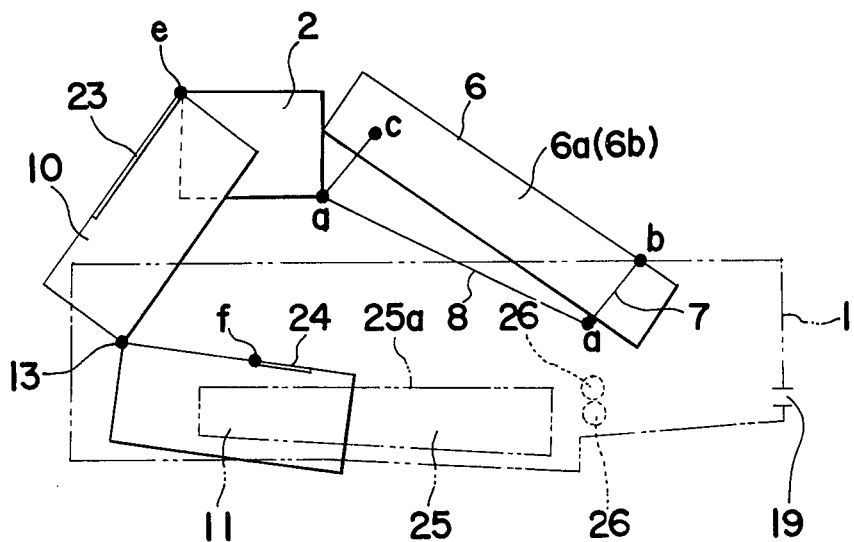
Figure 3:
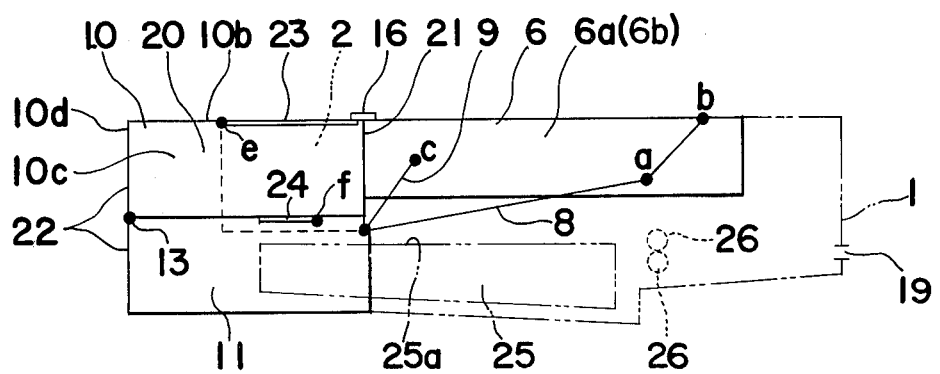

A hinge element 13 which is located at the upper end portions of the end walls 10*d* and 11*d* of the boxes 10 and 11 provides hinges connection between the boxes 10 and 11, and permits the boxes 10 and 11 to be pivoted with respect to one another and moved to an opened position in which the end walls 10*d* and 11*d* thereof are in flat contact with one another and the bottom walls 10*b* and 11*b* thereof are in straight alignment, as shown in FIG. 3(*a*), or to a folded position in which edges of the corresponding side walls 10*c* and 11*c* and of the end walls 10*d* and 11*d* thereof are in flat contact, corresponding side walls 10*c* and 11*c* and the end walls 10*d* and 11*d* thereof are in straight alignment, and the bottom walls 10*b* and 11*b* thereof are parallel to one another, as shown in FIG. 3(*c*). When in the folded position, therefore, the boxes 10 and 11 together constitute a container having a single open end.

Referring again to FIG. 4, in each side wall 10*c* of the forward box 10 there is formed a slot 23 which is adjacent to the lower edge of the side wall 10*c*, i.e., to the junction of the side wall 10*c* with the bottom wall 10*b* of the box 10, and extends from a point near the open end 10*a* of the box 10 to approximately the centre point of the lower edge of the side wall 10*c*. In each side wall 11*c* of the rear box 11 there is formed a slot 24 which is immediately adjacent to the upper edge of the side wall 11*c*, and extends from approximately the centre of the upper edge portion of the side wall 11*c* to a point of the side wall upper portion which is approximately halfway between the centre thereof and the open end 11*a* of the rear box 11. In each slot 23 and 24 there is provided an expansion spring element, not shown, which is large enough to exert pressure against opposite ends of the slot. Alternatively, the expansion spring elements may be provided on the side walls 10*c* and 11*c* of the boxes 10 and 11, and be exterior to, but aligned with the slots 23 and 24.

Referring again to FIGS. 1 and 3(*a*), fixedly attached to the front lower corner portion of the lens mount 2 there is a shaft *e* whose opposite end portions extend to beyond opposite sides of the lens mount 2, and are slidably and rotatably fitted in the slots 23 defined in the opposite side walls 10*c* of the forward box 10, retainer studs or similar elements being mounted on the outermost end portions of the shaft *e*, in order to maintain connection between the forward box 10 and the lens mount 2. When the box assembly (10, 11) is in the opened position, the expansion spring elements provided in the slots 23 press the shaft *e*, and hence the lower portion of the lens mount 2, to the outer ends of the slots 23, i.e., the ends thereof nearest to the open end 10*a* of the forward box 10.

The box assembly (10, 11) may be fixedly held in an open position by lock means 12, component portions of which are provided on the bottom wall 10*b* of the forward box 10 adjacent to the junction of the bottom wall 10*b* and end wall 10*d*, and on the bottom wall 11*b* of the rear box 11 adjacent to the junction of the bottom wall 11*b* and end wall 11*d*. The lock means 12 may be constituted by separate means provided near opposite sides of the boxes 10 and 11 or by a single lock means extending across the entire width of the boxes 10 and 11.

In the interior of the camera main body portion 1 there is provided a fixed shaft *f* which is disposed in left-to-right alignment with respect to the camera, is in a generally central position with respect to the front-to-rear dimension of the camera, and passes through the slots 24 defined in the side walls 11*c* of the rear box 11, the slots 24 permitting free sliding and rotatory movement of the rear box 11 with respect to the shaft *f*. When the folding-box assembly (10, 11) is in the opened position, the shaft *f* contacts the ends of the slots 24 which are closer to the end wall 11*d* of the rear box 11, the opposite ends of the slots 24 being pushed away from the shaft *f* by the expansion spring elements provided in the slots 24.

Referring more particularly to FIG. 3(*a*), when the folding-box assembly (10, 11) is in the opened position, the lens mount 2 is moved to and held in the abovementioned first position, which is determined by the relative dimensions of the box assembly (10, 11) and the two quadrilateral linkages constituted by the opposite sides 6*a* and 6*b* of the case 6 and associated link rods 7, 8, and 9. This first position of the lens mount 2 is such that the lens assembly 3 is held in a position and in an attitude to permit photographs to be taken, as noted earlier. The spring elements provided in the slots 23 and 24 suitably have attached to ends thereof cuspate elements which may partially enclose the shafts *e* and *f* and exert force and have values of stiffness such that, in the absence of an externally applied counter force, the shaft *e* is held stationary with respect to the forward box 10, and the rear box 11 is held stationary with respect to the shaft *f*. Thus, when the folding box assembly (10, 11) is in the opened position, the lens mount 2 is supported on each opposite side thereof by what is effectively a support element having four pivotal points, which are the shafts *d*, *e*, and *f* and the hinge 13. However, since pivotal movement of or about the shafts *e* and *f* is prevented for the abovenoted reasons, and pivotal movement about the hinge 13 is prevented by the lock means 12, the box assembly (10, 11) constitutes a rigid support for the lens mount 2. Of the four pivotal points of the quadrilateral linkage constituted on each side of the case 6 also, the points *a* and *b* are permanently fixed, and the point *d* becomes fixed when the box assembly reaches a fully opened position, since the lens mount 2 is a rigid element and the axis of the shaft *e* becomes fixed when the box assembly is opened, and there is therefore no need to provide separate lock means for the case 6, whose function is to accommodate the flash control elements, toconstitute a cover to a rear portion of the camera, as described below, and, in association with the link rods 7, 8, and 9, to ensure that the lens mount 2 is set square with respect to the camera.

Needless to say, even if the pins a are not fixed, unrequired movement of the case 6 is prevented when the box assembly (10, 11) is held in the opened position, since in this situation diametrically opposite points, the points e and b, of the quadrilateral linkage on each side of the case 6 are fixed.

Referring now to FIGS. 3(a) and 3(b), if the camera is temporarily not required for taking photographs, first the lock means 12 is released, and then manual pressure is applied on the outer side of the case 6. This pressure, which is suitably applied as a gripping action, causes the case 6 to pivot anticlockwise as seen in the drawings about the pivot points a and b, so causing the lens mount 2 to move anticlockwise along a curved path out of front-to-rear line with the exposure station and towards the lower portion of the front of the camera, as illustrated in FIG. 3(b). As the lens mount 2 is thus moved, the shaft e attached to the lower front corner portion thereof exerts on the forward box 10a force which acts downwards and also a force which acts rearwards towards the camera front wall 1a, and so causes the other end of the box 10 to simultaneously move downwards and rearwards, the spring elements provided in the slots 23 in the side walls 10c of the forward box 10 being compressed during this movement. The forward box 10 therefore, while simultaneously exerting a downwardly and rearwardly acting force on the hinge 13, pivots clockwise about the hinge 13, towards the rear box 11, and acting through the hinge 13 pushes rearward and downwards on the end wall 11c of the rear box 11, whereby the rear box 11 is caused to pivot anticlockwise about the hinge 13 and also about the shaft f and to simultaneously move downwards, the spring elements provided in the slots 24 being compressed by the shaft f as a result of this downward movement of the box 11.

As pressure continues to be applied on the outer cover of the case 6, the boxes 10 and 11 are moved to the closed position and the lens mount 2 is swung further out of front-to-rear alignment with the exposure opening 25a of the film unit pack 25 and is moved via the open ends 10a and 11a of the boxes 10 and 11 into the space defined by the interiors of the boxes 10 and 11, the spring elements in the slots 23 and 24 becoming more and more compressed by the shafts e and f respectively during this movement. When the boxes 10 and 11 have been brought completely to the closed position shown in FIG. 3(c), the end walls 10d and 11d thereof effectively constitute the bottom wall 22 of the camera, the bottom wall 11b of the rear box 11 constitutes the lower portion of the rear wall of the camera, the box 11 at least partially surrounds the lightproof exposure compartment 15, the lens mount 2 is entirely enclosed in a space defined between the boxes 10 and 11, and the forward box 10 and case 6 lie inside the opening 1b, the bottom wall 10b and the outer cover of the case 6 being in level alignment with one another and with the front wall 1a of the camera main body portion 1. Also, the rear surface of the lens mount 2 is generally in line with the front surface of the exposure compartment 15.

The folding box assembly (10, 11) lens mount 2, and case 6 may be maintained in these positions by a lock means 16, which are suitably of a type which lock automatically as the case 6 is pressed into place, and are provided on opposite side portions of the camera front wall 1a and may hold the case 6 and the forward box 10 together. The lock means 16 may of course be constituted by separate elements, as shown in FIG. 2, or in order to facilitate manipulation of the camera may be constituted as a single element extending across the upper corner portion of the case 6.

To again bring the lens mount 2 to the first position permitting a photograph to be taken, it is simply necessary to release the lock means 16. Hereupon, the spring elements provided in the slots 23 and 24 of the boxes 10 and 11 push against the shafts e and f, resulting in movement of the folding camera elements from the positions shown in FIG. 3(c) to the positions shown in FIG. 3(b) and then to the positions shown in FIG. 3(a). Needless to say, the outer cover of the case 6 may be provided with a grip means permitting manual pulling action to assist this movement. When the camera elements are again in the positions shown in FIG. 3(a), the lock means 12 is again applied.

Thus, while having a very simple construction, the camera may be rapidly and easily set to a disposition permitting accurate production of photographs or brought to a compact case shape, as shown in FIG. 2, which permits easy transport thereof and in which the lens mount 2 and elements carried thereby are completely protected. Further compactness of camera construction is achieved since the folding-box assembly (10, 11) constituting the main support for the lens mount 2 is hollow and so requires little accommodation space in the camera, and also since separate accommodation in the camera for batteries and flash control circuits, etc. is unnecessary as these elements are contained in the case 6. It will also be noted that setting the camera of the invention to an opened of a folded position requires only very simple actions to be effected by the photographer.

The construction of the camera may be such that when the folding-box assembly (10, 11), case 6, and lens mount 2 are in the extended positions the lower end portion of the camera is defined by the outer surface of the exposure compartment 15 and the lower portions of the side walls of the camera main body portion 1 which extend to below the level of the exposure compartment 15 and so define an open portion in which the forward box 10 and rear box 11 may move when the box assembly (10, 11) is moved to or from the folded and opened positions, or there may be defined an outer wall which encloses the exposure compartment 15 and in which there are defined slots permitting free movement of the boxes 10 and 11.

Needless to say various modifications which will be apparent to those skilled in the art may be made to the abovedescribed construction without departure from the principles of the invention. For example, the fixed shafts d, e, and f may be replaced by fixed pin or stud elements located in positions corresponding to the ends of the shafts d, e, and f, or there may be provided at the ends of the spring elements provided in the slots 23 defined in the forward box prong elements which may enclose the shaft e and extend into engagement holes defined in the outer wall portion of the lens mount 2 adjacent to the shaft e, whereby maintenance of the lens mount 2 in a fixed position is further ensured. Similarly, there may be provided at the ends of the spring elements disposed in the slots 24 defined in the rear box 11 prong elements which may extend into open portions defined in inner wall portions of the camera adjacent to the shaft *f* and which prevent more than a certain amount of clockwise movement of the rear box 11 about the shaft 11.

Referring now to FIG. 5, the abovementioned opaque hood element 14 suitably comprises a comparatively rigid front frame 29 which is fixedly attached to the rear of the lens mount 2 and defines an opening 28 situated in a location corresponding to that of the lens assembly 3, the opening 28 being large enough to permit unhindered entry into the opaque hood element 14 of the entirety of external light gathered by the lens assembly 3. The hood element 14 also compress a rear frame 30 which is attached to the front wall portion of the exposure compartment 15 and defines an opening which is at least equal in size to the exposure opening 15a defined in the expartment 15 front wall, a top wall 32a which extends from the front frame 29 to the rear frame 30, and a lower wall 32b which extends from the front frame 29 to a flared base portion 34 which connects the rear edge of the lower wall 32b to the lower edge portion of the rear frame 30, and which, when the camera is opened as in the position shown in FIG. 5, extends downwardly and rearwardly from the lower wall 32b to the rear frame 30. Left and right side walls 31 which extend between the front frame 29 and rear frame 30 have upper edges integrally attached to the top wall 32a and lower edges connecting to the lower wall 32b and flared base portion 34 whereby there is constituted a completely enclosed and opaque portion between the frames 29 and 30. In each side wall 31 there is defined a fold-out line 31a which extends diagonally across the side wall 31 from the lower front corner portion thereof to the upper rear corner portion thereof. Extending in front-to-rear line in each of the generally triangular portions which are defined in each side wall 31 by the diagonal fold-out line 31a there is a fold-in line 31b. In the front end portion of the upper wall 32a there is formed a fold-in line 33 which is generally parallel to the upper edge of the front frame 29. The line of junction between each side wall 31 and the flared base portion 34 also defines a fold-in line 35. In addition, of course, there may be defined in the side walls 31 other suitable fold-in and fold-out lines.

With this construction, the hood element 14 is normally held in an extended position in which it permits image-wise light to pass from the lens assembly 3 to a foremost film unit 27 in the film unit pack 25. When the camera is folded, the hood element 14 is swung downwards, the rear frame 30 thereof remaining stationary, and during this movement the front frame 29 is maintained generally parallel to the plane of the front wall 1a of the camera, the diagonal fold-out lines 31a in opposite side walls 31 fold outwards, and the lines 31b and lines 35 fold inwards, so bringing portions adjacent thereto to between the upper wall 32a and lower wall 32b, whereby the hood element 14 is brought to a flat, folded disposition and extends between the rear surface of the lens mount 2 and front surface of the exposure compartment 15 in a generally vertical alignment, when the camera elements are brought to the disposition shown in FIG. 3(c).

It will be noted that with this construction, there is only slight difference in side-to-side dimensions of the hood element 14 in the folded and opened conditions, and the hood element 14 need only be large enough to permit passage of light from the lens assembly 3 to a film unit at the exposure station.

Although the present invention has fully been described in conjunction with the preferred embodiments thereof with reference to the accompanying drawings, it is to be noted that various changes and modifications are apparent to those skilled in the art. Accordingly, such changes and modifications are to be understood as included within the true scope of the present invention unless they depart therefrom.

What is claimed is:

1. Folding camera comprising at least an exposure compartment comprising opaque wall portions and defining an exposure station whereat film material may be exposed;

a lens mount carrying at least a taking lens means able to focus image-wise light reflected from an external scene to be photographed onto said film material, and having a first support shaft affixed to a first outer surface portion thereof and a second support shaft affixed to a second outer surface portion thereof which is diametrically opposed to said first outer surface portion thereof;

a forward camera portion defining a front opening which extends at least over an area corresponding to the area of said exposure compartment and the forward portion of which is defined by the front wall of said camera;

a first fixed shaft which extends across an upper end portion of said front opening;

a second fixed shaft which is located in a lower portion of said camera and which with respect to the front-to-rear dimension of said camera is in a generally central portion of said camera lower portion;

parallel quadrilateral linkage assemblies comprising a case means having a rear end portion pivotally mounted on said first fixed shaft, and on each side of said case a first link rod having one end pivotally mounted on said first fixed shaft and the opposite end thereof pivotally mounted on a first link pin located below and rearwardly of said first fixed shaft, a second link rod having one end pivotally mounted on said first link pin and the opposite end pivotally mounted on said second support shaft affixed to said second outer surface portion of said lens mount, and a third link rod having one end pivotally mounted on said second link pin and the opposite end pivotally mounted on a third link pin which is fixedly attached to a forward end portion of said case side, whereby said case may be moved to a first case position wherein said case is extended forwardly and downwardly with respect to said camera front wall and to a second case position wherein said case lies within said front opening of said camera and the outer cover of said case is on a plane generally level with that of said camera front wall, said lens mount being maintained at all times below the lower end portion of said case and being brought to a first lens mount position in which said lens mount is held forward of and clear of said camera front wall when said case is at said first case position and to a second lens mount position which is in the area of said front opening of said camera when said case is brought to said second case position;

a folding-box assembly comprising a rear box and a forward box, each said box comprising a bottom wall, two opposite side walls, and one end wall and defining an open top and an open end, said boxes having generally equal dimensions, having a width greater than that of and together defining a total space greater than that of said lens mount, and being in hinged attachment through a hinge element provided across the upper edges of said end walls thereof, the upper edge portions of said side walls of said rear box defining slots through which said second fixed shaft passes, whereby said rear box is pivotally and slidably movable about said second fixed shaft, and the forward end portions of the lower portions of said side walls of said forward box defining slots through which said first support shaft affixed to said first outer surface portion of said lens mount passes, whereby said lens mount is rotatable and slidable with respect to said forward box; and an opaque hood element which has a front end portion attached to the rear portion of said lens mount and a rear end portion attached to the front portion of said exposure compartment, which when said lens mount is at said first lens mount position is extended and defines a hollow chamber, and which when said lens mount is moved to said second lens mount position is moved sideways and folded flat to a position wherein it lies generally level with the plane of said front portion of said exposure compartment.

2. Folding camera as claimed in claim 1, wherein said folding-box assembly further comprises lock means provided adjacent to junction portions of said bottom walls and said end walls of said rear box and said forward box, and actuable to maintain said folding-box assembly in said opened position.

3. Folding camera as claimed in claim 1, which further comprises lock means provided on side portions of said camera front wall and actuable to hold said case in said closed position.

4. Folding camera as claimed in claim 1, wherein said folding-box assembly further comprises forward box spring means which are provided in said slots defined in said side walls of said forward box and which exert a constant force urging said first support shaft towards the open end of said forward box, and rear box spring means which are provided in said slots defined in said side walls of said rear box and which exert a constant force urging said open end portion of said rear box away form said second fixed shaft.

* * * * *